United States Patent
Chen et al.

(10) Patent No.: US 11,719,784 B2
(45) Date of Patent: Aug. 8, 2023

(54) METHOD FOR POSITIONING UNDERWATER GLIDER BASED ON VIRTUAL TIME DIFFERENCE OF ARRIVAL OF SINGLE BEACON

(71) Applicant: Zhejiang University, Zhejiang (CN)

(72) Inventors: Huifang Chen, Zhejiang (CN); Lei Xie, Zhejiang (CN); Feng Liu, Zhejiang (CN); Chenglei Lv, Zhejiang (CN); Wen Xu, Zhejiang (CN)

(73) Assignee: Zhejiang University, Zhejiang (CN)

( * ) Notice: Subject to any disclaimer, the term of this patent is extended or adjusted under 35 U.S.C. 154(b) by 98 days.

(21) Appl. No.: 17/481,872

(22) Filed: Sep. 22, 2021

(65) Prior Publication Data

US 2022/0128647 A1 Apr. 28, 2022

(30) Foreign Application Priority Data

Oct. 28, 2020 (CN) .......................... 202011170484.6

(51) Int. Cl.
  *G01S 5/26* (2006.01)
(52) U.S. Cl.
  CPC ...................................... *G01S 5/26* (2013.01)
(58) Field of Classification Search
  None
  See application file for complete search history.

(56) References Cited

U.S. PATENT DOCUMENTS

| 3,559,161 A * | 1/1971 | Raudsep | .................... G01S 1/02 367/901 |
|---|---|---|---|
| 2011/0148710 A1* | 6/2011 | Smid | ....................... G01S 13/46 342/394 |

(Continued)

FOREIGN PATENT DOCUMENTS

| CN | 105353351 A | * | 2/2016 | ............... G01S 5/22 |
|---|---|---|---|---|
| CN | 110412546 A | * | 11/2019 | ........... G01C 21/165 |

(Continued)

OTHER PUBLICATIONS

Vaganay, J., P. Baccou, and B. Jouvencel. "Homing by acoustic ranging to a single beacon." Oceans 2000 MTS/IEEE Conference and Exhibition. Conference Proceedings (Cat. No. 00CH37158). vol. 2. IEEE, 2000. (Year: 2000).*

(Continued)

*Primary Examiner* — Isam A Alsomiri
*Assistant Examiner* — Jonathan D Armstrong
(74) *Attorney, Agent, or Firm* — Danielle C. Sullivan; Carter Ledyard & Milburn LLP

(57) ABSTRACT

A method for positioning an underwater glider based on a virtual TDOA of a single beacon is provided. In the method, a positioning beacon periodically sends positioning messages, where the positioning message includes longitude, latitude and depth information of the positioning beacon; the underwater glider receives the positioning messages and records TOAs at which the positioning messages arrive at an acoustic positioning signal receiving module; and the underwater glider parses the positioning messages and stores positioning message data, creates virtual beacons based on beacon information and attitude information of the underwater glider, corrects the TOAs, and calculates a position of the underwater glider according to a TDOA algorithm. According to the method, the underwater glider passively listens to and receives the positioning messages without sending a positioning request to the positioning beacon, making the entire positioning process energy-saving with a certain degree of concealment.

4 Claims, 1 Drawing Sheet

(56) References Cited

U.S. PATENT DOCUMENTS

| | | | | |
|---|---|---|---|---|
| 2013/0252631 A1* | 9/2013 | Alizadeh-Shabdiz | | H04W 4/025 455/456.1 |
| 2022/0128647 A1* | 4/2022 | Chen | | G01S 5/18 |
| 2022/0260663 A1* | 8/2022 | Pados | | G01S 15/60 |

FOREIGN PATENT DOCUMENTS

| | | | | |
|---|---|---|---|---|
| CN | 110554359 A | * | 12/2019 | G01C 21/16 |
| CN | 111190139 A | * | 5/2020 | |
| EP | 3267216 A1 | * | 1/2018 | G01S 1/685 |
| JP | 2003189353 A | * | 7/2003 | G01S 5/06 |
| WO | WO-2010000036 A1 | * | 1/2010 | G01S 13/876 |
| WO | WO-2021101613 A1 | * | 5/2021 | G01S 1/753 |

OTHER PUBLICATIONS

Baccou, P., B. Jouvencel, and V. Creuze. "Single beacon acoustic for AUV navigation." International Conference on Advanced Robotics. 2001. (Year: 2001).*

Casey, Thomas, Brian Guimond, and James Hu. "Underwater vehicle positioning based on time of arrival measurements from a single beacon." Oceans 2007. IEEE, 2007. (Year: 2007).*

Webster, Sarah E., et al. "Preliminary deep water results in single-beacon one-way-travel-time acoustic navigation for underwater vehicles." 2009 IEEE/RSJ International Conference on Intelligent Robots and Systems. IEEE, 2009. (Year: 2009).*

Webster, Sarah E., Louis L. Whitcomb, and Ryan M. Eustice. "Advances in decentralized single-beacon acoustic navigation for underwater vehicles: Theory and simulation." 2010 IEEE/OES Autonomous Underwater Vehicles. IEEE, 2010. (Year: 2010).*

Webster, Sarah E., Louis L. Whitcomb, and Ryan M. Eustice. "Preliminary results in decentralized estimation for single-beacon acoustic underwater navigation." Robotics: Science and Systems VI (2010): 1-8. (Year: 2010).*

Webster, Sarah E., et al. "Advances in single-beacon one-way-travel-time acoustic navigation for underwater vehicles." The International Journal of Robotics Research 31.8 (2012): 935-950. (Year: 2012).*

Quenzer, Jake Dean. Observability Based Path Planning in Range-only Localization. Diss. 2013. (Year: 2013).*

Masmitja, I., et al. "Range-only underwater target localization: Path characterization." Oceans 2016 MTS/IEEE Monterey. IEEE, 2016. (Year: 2016).*

Zhu, Zhongben, and Sau-Lon James Hu. "Model and algorithm improvement on single beacon underwater tracking." IEEE Journal of Oceanic Engineering 43.4 (2017): 1143-1160. (Year: 2017).*

Zhu, Ziyao, et al. "Single beacon location algorithm based on nonlinear fading filter under multiplicative noise background." 电子与信息学报 41.1 (2019): 165-171. (Year: 2019).*

Liu, Feng, Huifang Chen, and Lei Xie. "Autonomous Underwater Glider Navigation with Single Seabed Beacon." Global Oceans 2020: Singapore—US Gulf Coast. IEEE, 2020. (Year: 2020).*

Chen, Huifang, et al. "Sea experiment of positioning underwater mobile vehicles using multiple surface beacons." Global Oceans 2020: Singapore—US Gulf Coast. IEEE, 2020. (Year: 2020).*

Liu, Feng, Huifang Chen, and Lei Xie. "A Novel Multi-AUV Cooperative Navigation Method Using Information Incorporation." Oceans 2022, Hampton Roads. IEEE, 2022. (Year: 2022).*

Zhao, Yunxin, et al. "A collaborative control framework with multi-leaders for AUVs based on unscented particle filter." Journal of the Franklin Institute 353.3 (2016): 657-669. (Year: 2016).*

* cited by examiner

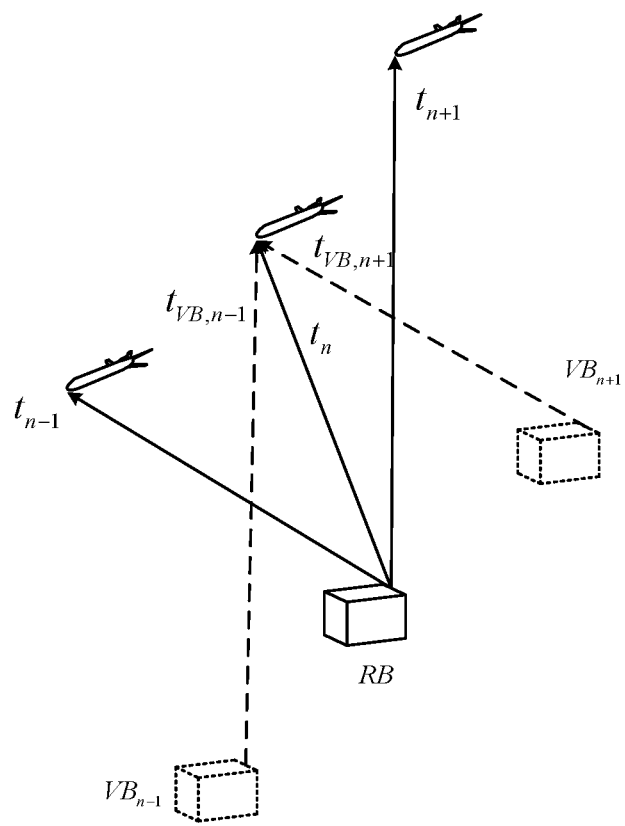

METHOD FOR POSITIONING UNDERWATER GLIDER BASED ON VIRTUAL TIME DIFFERENCE OF ARRIVAL OF SINGLE BEACON

CROSS REFERENCE TO RELATED APPLICATION

This patent application claims the benefit and priority of Chinese Patent Application No. 202011170484.6 filed on Oct. 28, 2020, the disclosure of which is incorporated by reference herein in its entirety as part of the present application.

TECHNICAL FIELD

The present disclosure belongs to the technical field of underwater acoustic positioning, and relates to a method for positioning an underwater glider based on a single beacon, and specifically, to a method for positioning the underwater glider based on a virtual time difference of arrival (TDOA) of the single beacon to implement a position estimation of the underwater glider by creating two virtual beacons based on time of arrival (TOA) of a positioning message and attitude information of the underwater glider.

BACKGROUND ART

The ocean covers nearly 70% of the earth and contains abundant natural resources. With a gradual reduction of energy reserves on land, such as petroleum, more and more countries have begun to turn focus to the oceans. Therefore, in recent years, marine resource exploration, marine environmental monitoring, and research and development of underwater equipment have gradually become hot topics. Underwater robots, such as autonomous underwater vehicles (AUVs), underwater gliders (UGs), and remote operated vehicles (ROVs), have been increasingly used in the marine environmental monitoring and underwater target detection. Such underwater equipment often need to be maneuvered to a designated area to perform corresponding underwater tasks, and positioning accuracy of the equipment affects implementation of the tasks to some extent. With growing requirements for marine detection and underwater target recognition and more and more sophisticated tasks, how an underwater robot obtains relatively accurate underwater position becomes more and more important.

Because electromagnetic wave signals are greatly attenuated in water, most of mature terrestrial positioning systems (such as the United States' global positioning system and China's Beidou positioning system) are not suitable for positioning the underwater robots working in the sea. Different from the electromagnetic wave signals, acoustic signals have a small attenuation in seawater, which can realize a long-distance transmission of an underwater signal. Therefore, as a main carrier of underwater information transmission, underwater acoustic signals are often used in the field of underwater equipment communication and positioning.

In recent decades, long-baseline, short-baseline, and ultra-short-baseline acoustic positioning methods and systems have been developed. A traditional long-baseline positioning system can be used for autonomous positioning of the underwater equipment. Generally, an acoustic beacon array needs to be deployed on seabed, and a response mechanism is used for ranging, thereby obtaining higher positioning accuracy. However, the long-baseline positioning system requires many underwater acoustic transponders to be deployed in the water, and the procedure for calibrating positions of the transponders is complicated, which increases costs of implementation. A short-baseline underwater acoustic positioning system requires a sensor array to be deployed on a carrier platform, and the underwater equipment to be installed with a corresponding transponder, so as to locate the underwater equipment. However, due to short baseline length, the short-baseline underwater acoustic positioning system has a limited range of action. An ultra-short-baseline underwater acoustic positioning system also requires an acoustic baseline array to be deployed on the carrier platform, and the underwater equipment to be installed with the transponder, to use the response mechanism to achieve the positioning of the underwater equipment. In addition, the ultrashort-baseline underwater acoustic positioning system also has a problem of complicated sensor calibration. On this basis, there are also some combined positioning solutions that have both the accuracy of the long-baseline solution and portability of the ultrashort-baseline solution. However, all these underwater acoustic positioning methods require the installation of the transponder to complete distance measurement or angle measurement, and the positioning system is relatively complicated; in addition, according to above underwater acoustic positioning methods, the underwater equipment to be located needs to be installed with a transponder, which cannot achieve desired energy saving and concealment.

Based on the idea of the long-baseline positioning, a method for positioning the underwater robot based on multiple beacons has been developed, which uses multiple beacons to exchange information with the underwater robot for ranging, and calculates a position of the underwater robot based on positions of the multiple beacons and ranging information. According to different working modes, the underwater robot can actively send a positioning request to the beacons, or passively receive positioning messages broadcast by the beacons to obtain the ranging information. A Chinese patent application No. CN201711371839.6 discloses a method for autonomous positioning of an underwater mobile node based on Beidou beacons, in which a positioning array is composed of three beacons on the sea to broadcast the positioning messages synchronously, and the underwater robot passively listens to the messages, and completes calculation of position after receiving three positioning messages.

Compared with the method for positioning the underwater robot based on multiple beacons, a positioning technology of the underwater robot based on a single beacon is a new direction for the underwater acoustic positioning. In this positioning method, the underwater robot only needs to use the positioning message sent by one beacon node, to combine an acoustic ranging and positioning device with a motion sensor of the robot to estimate a position of the underwater robot.

Currently, there are already some methods for positioning the underwater robot based on a single beacon. Patent application Nos. CN201710599165.9 and CN201710599155.5 respectively disclose a virtual beacon-based AUV positioning and tracking method and a single-beacon ranging and positioning method based on virtual beacon transceiving. These two tracking methods have limitation that a slant range from a positioning beacon to the AUV is used to locate a node, which requires the node and the beacon to be in strict clock synchronization.

As a kind of underwater robot driven by buoyancy, the UG can move up or down by changing the buoyancy, and use wings to control the movement. A complete up and down motion trajectory is similar to a shape of a sine function. Since the UG is not equipped with a propeller, the UG consumes much less energy than underwater robots such as an AUV, so it can work underwater for a long time.

Like most existing underwater robot positioning methods, most of the underwater acoustic positioning methods for the UG also have following problems:

1. The underwater robot needs to be in clock synchronization with the beacon. In a complex underwater environment, clock drift of the underwater robot is difficult to correct, making it hard to maintain precise synchronization with a beacon node.

2. In response mode, the underwater robot needs to be equipped with the transponder. For the sake of energy saving, some underwater robots are not equipped with signal transmitters and cannot transmit response signals. In addition, in scenarios with special security requirements, the underwater robot cannot transmit signals considering the concealment.

3. A position estimated by a dead reckoning module inside the underwater robot has a large deviation from an actual position.

SUMMARY OF THE INVENTION

To overcome shortcomings of the conventional art, the present disclosure provides a method for positioning an underwater glider based on a TDOA of a single beacon.

The method according to the present disclosure specifically includes the following steps.

Step (1): periodically sending, by a positioning beacon, a positioning message at a fixed time interval T, wherein the positioning message comprises longitude, latitude and depth information of the positioning beacon;

Step (2): receiving, by the underwater glider, the positioning messages, and recording time of arrivals (TOAs) at which the positioning messages arrive at an acoustic positioning signal receiving module;

Step (3): parsing, by the underwater glider, the positioning messages and storing positioning message data; which specifically includes:

(3-1): parsing the positioning message to obtain longitude $L_{RB}$, latitude $B_{RB}$ and depth $Z_{RB}$ of the positioning beacon; and (3-2): reading current attitude information of the underwater glider, comprising a pitch angle $\theta_n$, a heading angle $\phi_n$ and a depth $z_n$ at time $t_n$, wherein the pitch angle is an included angle between a moving direction of the underwater glider and a horizontal plane, the heading angle is an included angle between a horizontal component of the moving direction of the underwater glider and a due east direction, and the time $t_n$ is a time at which the n-th positioning message arrives at the underwater glider;

Step (4): calculating a position of the underwater glider, which specifically includes:

(4-1): extracting, from the positioning message data, the TOAs $t_{n-1}$, $t_n$, and $t_{n+1}$ of (n−1)-th, n-th, and (n+1)-th positioning messages, and pitch angles $\theta_{n-1}$, $\theta_n$, and $\theta_{n+1}$, heading angles $\phi_{n-1}$, $\phi_n$, and $\phi_{n+1}$, and depths $z_{n-1}$, $z_n$, and $z_{n+1}$ of the underwater glider at corresponding times;

(4-2): creating virtual beacons:

a. creating a virtual beacon $VB_{n-1}$ based on the positioning message data and the attitude information of the underwater glider at the times $t_{n-1}$ and $t_n$, which specifically includes:

taking the due east direction as a positive direction of X-axis and the due north direction as a positive direction of Y-axis, converting latitude and longitude coordinates ($L_{RB}$, $B_{RB}$) of a real positioning beacon parsed at the time $t_n$ into plane coordinates $(X_{RB}, Y_{RB}) = LB2XY(L_{RB}, B_{RB})$, where LB2XY represents the conversion from the latitude and longitude coordinates to the plane coordinates; in the plane coordinates of the $VB_{n-1}$, $$X_{VB,n-1} = X_{RB} + (z_n - z_{n-1})\arctan\frac{\theta_n + \theta_{n-1}}{2}\cos\frac{\phi_n + \phi_{n-1}}{2} \text{ and}$$

$$Y_{VB,n-1} = Y_{RB} + (z_n - z_{n-1})\arctan\frac{\theta_n + \theta_{n-1}}{2}\sin\frac{\phi_n + \phi_{n-1}}{2};$$

and a depth of the $VB_{n-1}$ is $Z_{VB,n-1} = Z_{RB} + z_n - z_{n-1}$; and converting the plane coordinates $(X_{VB,n-1}, Y_{VB,n-1})$ to latitude and longitude coordinates $(L_{VB,n-1}, B_{VB,n-1}) = XY2LB(X_{VB,n-1}, Y_{VB,n-1})$, where XY2LB represents a conversion from the plane coordinates to the latitude and longitude coordinates;

b. creating another virtual beacon $VB_{n+1}$ based on the positioning message data and the attitude information of the underwater glider at the times $t_n$ and $t_{n+1}$, where plane coordinates of the $VB_{n+1}$ are $(X_{VB,n+1}, Y_{VB,n+1})$, a depth of the $VB_{n+1}$ is $Z_{VB,n+1}$, and latitude and longitude coordinates of the $VB_{n+1}$ are $(L_{VB,n+1}, B_{VB,n+1})$;

$$X_{VB,n+1} = X_{RB} - (z_{n+1} - z_n)\arctan\frac{\theta_n + \theta_{n+1}}{2}\cos\frac{\phi_n + \phi_{n+1}}{2};$$

$$Y_{VB,n+1} = Y_{RB} - (z_{n+1} - z_n)\arctan\frac{\theta_n + \theta_{n+1}}{2}\sin\frac{\phi_n + \phi_{n+1}}{2};$$

$$Z_{VB,n+1} = Z_{RB} - z_{n+1} + z_n;$$

and $(L_{VB,n+1}, B_{VB,n+1}) = XY2LB(X_{VB,n+1}, Y_{VB,n+1});$ (4-3): calculating the position of the underwater glider based on the TDOA:

correcting TOAs of the virtual beacons $VB_{n-1}$ and $VB_{n+1}$ to obtain corrected TOAs $t_{VB,n-1}$ and $t_{VB,n+1}$:

$$t_{VB,n-1} = t_{n-1} + ri\left(\frac{t_n - t_{n-1}}{T}\right) \cdot T, \text{ and } t_{VB,n+1} = t_{n+1} - ri\left(\frac{t_{n+1} - t_n}{T}\right) \cdot T,$$

where ri is a rounding function; and calculating latitude and longitude coordinates $(L_n, B_n)$ of the underwater glider at the time $t_n$, which specifically includes:

(4-3-1): constructing a least squares positioning equation AX=H+Kd, where A, H, and K are known matrices, X is a position matrix to be solved, and d is an intermediate variable, $$A = \begin{bmatrix} 2(X_{VB,n-1} - X_{RB}) & 2(Y_{VB,n-1} - Y_{RB}) \\ 2(X_{VB,n+1} - X_{RB}) & 2(Y_{VB,n+1} - Y_{RB}) \end{bmatrix},$$

-continued $$K = \begin{bmatrix} 2(c(t_{VB,n-1} - t_n)) \\ 2(c(t_{VB,n+1} - t_n)) \end{bmatrix},$$

$$X = \begin{bmatrix} x_n \\ y_n \end{bmatrix}, \text{ and}$$

$$H = \begin{bmatrix} (X_{RB}^2 + Y_{RB}^2) - (X_{VB,n-1}^2 + Y_{VB,n-1}^2) + (Z_{RB} - z_n)^2 - (Z_{VB,n-1} - z_n)^2 + (c(t_{VB,n-1} - t_n))^2 \\ (X_{RB}^2 + Y_{RB}^2) - (X_{VB,n+1}^2 + Y_{VB,n+1}^2) + (Z_{RB} - z_n)^2 - (Z_{VB,n+1} - z_n)^2 + (c(t_{VB,n+1} - t_n))^2 \end{bmatrix},$$

where c is an effective sound velocity, and $x_n$ and $y_n$ represent a plane coordinate position of the underwater glider at the time $t_n$;

(4-3-2): solving the intermediate variable d:

constructing a quadratic equation with one variable $a_1 d^2 + a_2 d + a_3 = 0$ about the intermediate variable d, where intermediate variables $a_1$, $a_2$ and $a_3$ of the equation are:

$a_1 = N^2(1,1) + N^2(2,1) - 1$, $a_2 = 2(M(1,1) - X_{RB})N(1,1) + 2(M(2,1) - Y_{RB})N(2,1)$, and $a_3 = (M(1,1) - X_{RB})^2 + (M(2,1) - Y_{RB})^2 + (z_n - Z_{RB})^2$, where M and N are expressed by A, H and K as $M = (A^T A)^{-1} A^T K$ and $N = (A^T A)^{-1} A^T H$, represents transpose; and solving the equation to obtain $$d = \frac{-a_2 \pm \sqrt{a_2^2 - 4a_1 a_3}}{2a_1},$$

and discarding a singular value to obtain the intermediate variable d; and (4-3-3): solving the position matrix X to obtain a horizontal position $(L_n, B_n)$ of the underwater glider at the time $t_n$:

$$X = (A^T A)^{-1} A^T H + (A^T A)^{-1} A^T K d = \begin{bmatrix} x_n \\ y_n \end{bmatrix},$$

converting the plane coordinates $(x_n, y_n)$ to latitude and longitude coordinates to obtain the horizontal position of the underwater glider at the time $t_n$: $(L_n, B_n) = XY2LB(x_n, y_n)$, to complete the positioning of the underwater glider.

The method according to the present disclosure uses the positioning messages broadcast by the single beacon and attitude information of the underwater glider to create two virtual beacons, and uses the TDOA of the virtual beacons to estimate the position of the underwater glider, simplifying a construction of a positioning system. The underwater glider passively listens to and receives the positioning messages without sending a positioning request to the positioning beacon, making the entire positioning process energy-saving with a certain degree of concealment.

BRIEF DESCRIPTION OF THE DRAWINGS

FIG. 1 is a schematic diagram of virtual beacons according to a method in the present disclosure.

DETAILED DESCRIPTION

The present disclosure will be further described below in conjunction with specific embodiments and the accompanying drawing.

In a method for positioning an underwater glider based on a virtual TDOA of a single beacon, a positioning system used includes a positioning beacon deployed on the seabed, and an acoustic positioning signal receiving module, a positioning processing module, a pressure sensor, and an attitude sensor installed in the underwater glider.

The positioning beacon includes a positioning acoustic transceiver, and is configured to calibrate a position of the beacon and broadcast a positioning message, where after the beacon is deployed on the seabed, it first operates in a position calibration mode to obtain its own position, and then switches to beacon working mode.

The acoustic positioning signal receiving module includes a hydrophone and a signal receiving and processing module and is configured to listen to the positioning message sent by the positioning beacon, record content and a TOA of the positioning message. The pressure sensor is configured to obtain real-time depth information of the underwater glider. The attitude sensor is configured to obtain real-time attitude information of the underwater glider. The positioning processing module is configured to execute a positioning algorithm to estimate a position of the underwater glider.

The positioning message has a total of 128 bits, which in turn includes: a 12-bit synchronize sequence number (SYN), configured to indicate a start bit of the positioning message; a 4-bit type code TYP, configured to indicate a type of the positioning message; an 8-bit beacon identifier ID, configured to indicate the ID of the beacon sending the positioning message; an 8-bit reservation RES, reserved for control functions; a 32-bit longitude information LON, a 32-bit latitude information LAT, a 16-bit elevation (depth) information HEI; and a 16-bit frame check code FCC, configured to correct a frame error of a message.

The method specifically includes Step (1)-Step (4):

Step (1): The positioning beacon periodically sends a positioning message at a fixed time interval T, where the positioning message includes longitude, latitude and depth information of the positioning beacon.

Step (2): The underwater glider receives, by using the acoustic positioning signal receiving module, the positioning messages sent by the positioning beacon, and records TOAs at which the positioning messages arrive at the acoustic positioning signal receiving module.

Step (3): The underwater glider parses, by using the positioning processing module, the positioning messages and stores positioning message data, which specifically includes (3-1)-(3-2).

(3-1): The positioning processing module parses the positioning messages to obtain longitude $L_{RB}$, latitude $B_{RB}$ and depth $Z_{RB}$ of the positioning beacon.

(3-2): The positioning processing module reads current attitude information of the underwater glider from the attitude sensor, including a pitch angle $\theta_n$ and a heading angle $\phi_n$ at time $t_n$, where the pitch angle is an included angle between a moving direction of the underwater glider and a horizontal plane, and the heading angle is an included angle between a horizontal component of the moving direction of the underwater glider and the due east direction; and the positioning processing module reads a depth $z_n$ of the underwater glider at the time $t_n$ from the pressure sensor, where the time $t_n$ is a time at which the n-th positioning message arrives at the acoustic positioning signal receiving module.

Step (4): The position of the underwater glider is calculated, which specifically includes (4-1)-(4-4).

(4-1): TOAs $t_{n-1}$, $t_n$, and $t_{n+1}$ of the (n−1)-th, n-th, and (n+1)-th positioning messages, and pitch angles $\theta_{n-1}$, $\theta_n$, and $\theta_{n+1}$, heading angles $\phi_{n-1}$, $\phi_n$, and $\phi_{n+1}$, and depths $z_{n-1}$, $z_n$, and $z_{n+1}$ of the underwater glider at corresponding times are extracted from the positioning message data stored by the positioning processing module.

(4-2): Virtual beacons are created, as shown in FIG. 1:

a. creating a virtual beacon $VB_{n-1}$ based on the positioning message data and the attitude information of the underwater glider at the times $t_{n-1}$ and $t_n$, where plane coordinates of the $VB_{n-1}$ are $(X_{VB,n-1}, Y_{VB,n-1})$, a depth of the $VB_{n-1}$ is $Z_{VB,n-1}$ and latitude and longitude coordinates of the $VB_{n-1}$ are $(L_{VB,n-1}, B_{VB,n-1})$; which specifically includes:

taking due east as a positive direction of X-axis and the due north direction as a positive direction of Y-axis, converting latitude and longitude coordinates $(L_{RB}, B_{RB})$ of a real positioning beacon parsed at the time $t_n$ into plane coordinates $(X_{RB}, Y_{RB})$: $(X_{RB}, Y_{RB}) = LB2XY(L_{RB}, B_{RB})$, where LB2XY represents a conversion from the latitude and longitude coordinates to the plane coordinates; in the plane coordinates of the $VB_{n-1}$, $$X_{VB,n-1} = X_{RB} + (z_n - z_{n-1})\arctan\frac{\theta_n + \theta_{n-1}}{2}\cos\frac{\phi_n + \phi_{n-1}}{2} \text{ and}$$

$$Y_{VB,n-1} = Y_{RB} + (z_n - z_{n-1})\arctan\frac{\theta_n + \theta_{n-1}}{2}\sin\frac{\phi_n + \phi_{n-1}}{2};$$

and a depth of the $VB_{n-1}$ is $Z_{VB,n-1} = Z_{RB} + z_n - z_{n-1}$; and converting the plane coordinates $(X_{VB,n-1}, Y_{VB,n-1})$ to latitude and longitude coordinates $(L_{VB,n-1}, B_{VB,n-1})$: $(L_{VB,n-1}, B_{VB,n-1}) = XY2LB(X_{VB,n-1}, Y_{VB,n-1})$, where XY2LB represents a conversion from the plane coordinates to the latitude and longitude coordinates;

b. creating another virtual beacon $VB_{n+1}$ based on the positioning message data and the attitude information of the underwater glider at the times $t_n$ and $t_{n+1}$, where plane coordinates of the $VB_{n+1}$ are $(X_{VB,n+1}, Y_{VB,n+1})$, a depth of the $VB_{n+1}$ is $Z_{VB,n+1}$, and latitude and longitude coordinates of the $VB_{n+1}$ are $(L_{VB,n+1}, B_{VB,n+1})$;

$$X_{VB,n+1} = X_{RB} - (z_{n+1} - z_n)\arctan\frac{\theta_n + \theta_{n+1}}{2}\cos\frac{\phi_n - \phi_{n+1}}{2};$$

$$Y_{VB,n+1} = Y_{RB} - (z_{n+1} - z_n)\arctan\frac{\theta_n + \theta_{n+1}}{2}\sin\frac{\phi_n - \phi_{n+1}}{2};$$

$$Z_{VB,n-1} = Z_{RB} - z_{n+1} + z_n;$$

and $(L_{VB,n+1}, B_{VB,n+1}) = XY2LB(X_{VB,n+1}, Y_{VB,n+1})$.

(4-3): The position of the underwater glider is calculated based on the TDOA as follows:

since the TOAs of the (n−1)-th, the n-th and the (n+1)-th positioning messages received by the underwater glider are different, TOAs of the virtual beacons $VB_{n-1}$ and $VB_{n+1}$ are corrected to obtain corrected TOAs $t_{VB,n-1}$ and $t_{VB,n+1}$:

$$t_{VB,n-1} = t_{n-1} + ri\left(\frac{t_n - t_{n-1}}{T}\right) \cdot T, \text{ and } t_{VB,n+1} = t_{n+1} - ri\left(\frac{t_{n+1} - t_n}{T}\right) \cdot T,$$

where ri is a rounding function.

Latitude and longitude coordinates $(L_n, B_n)$ of the underwater glider at the time $t_n$ are calculated, which specifically includes:

(4-3-1): constructing a least squares positioning equation AX=H+Kd, where A, H, and K are known matrices, X is a position matrix to be solved, and d is an intermediate variable, $$A = \begin{bmatrix} 2(X_{VB,n-1} - X_{RB}) & 2(Y_{VB,n-1} - Y_{RB}) \\ 2(X_{VB,n+1} - X_{RB}) & 2(Y_{VB,n+1} - Y_{RB}) \end{bmatrix},$$

$$K = \begin{bmatrix} 2(c(t_{VB,n-1} - t_n)) \\ 2(c(t_{VB,n+1} - t_n)) \end{bmatrix},$$

$$X = \begin{bmatrix} x_n \\ y_n \end{bmatrix}, \text{ and}$$

$$H = \begin{bmatrix} (X_{RB}^2 + Y_{RB}^2) - (X_{VB,n-1}^2 + Y_{VB,n-1}^2) + (Z_{RB} - z_n)^2 - (Z_{VB,n-1} - z_n)^2 + (c(t_{VB,n-1} - t_n))^2 \\ (X_{RB}^2 + Y_{RB}^2) - (X_{VB,n+1}^2 + Y_{VB,n+1}^2) + (Z_{RB} - z_n)^2 - (Z_{VB,n+1} - z_n)^2 + (c(t_{VB,n+1} - t_n))^2 \end{bmatrix},$$

where C is an effective sound velocity, and $x_n$ and $y_n$ represent a plane coordinate position of the underwater glider at the time $t_n$;

(4-3-2): solving the intermediate variable d:

constructing a quadratic equation with one variable $a_1 d^2 + a_2 d + a_3 = 0$ about the intermediate variable d, where intermediate variables $a_1$, $a_2$ and $a_3$ of the equation are:

$a_1 = N^2(1,1) + N^2(2,1) - 1$, $a_2 = 2(M(1,1) - X_{RB})N(1,1) + 2(M(2,1) - Y_{RB})N(2,1)$, and $a_3 = (M(1,1) - X_{RB})^2 + (M(2,1) - Y_{RB})^2 + (z_n - Z_{RB})^2$, where M and N are expressed by A, H and K as $M = (A^T A)^{-1} A^T K$ and $N = (A^T A)^{-1} A^T H$, T represents transpose; and solving the equation to obtain $$d = \frac{-a_2 \pm \sqrt{a_2^2 - 4a_1 a_3}}{2a_1},$$

and discarding a singular value to obtain the intermediate variable d.

(4-3-3): solving the position matrix X to obtain a horizontal position $(L_n, B_n)$ of the underwater glider at the time $t_n$:

$$X = (A^T A)^{-1} A^T H + (A^T A)^{-1} A^T Kd = \begin{bmatrix} x_n \\ y_n \end{bmatrix},$$

converting the plane coordinates $(x_n, y_n)$ to latitude and longitude coordinates to obtain the horizontal position of the underwater glider at the time $t_n$: $(L_n, B_n) = XY2LB(x_n, y_n)$, to complete the positioning of the underwater glider.

What is claimed is:

1. A method for positioning an underwater glider based on a virtual time difference of arrival (TDOA) of a single beacon, wherein the method comprises:

periodically sending, by a positioning beacon, a positioning message at a fixed time interval T, wherein the positioning message comprises longitude, latitude and depth information of the positioning beacon;

receiving, by the underwater glider, the positioning messages, and recording time of arrivals (TOAs) at which the positioning messages arrive at an acoustic positioning signal receiving module;

parsing, by the underwater glider, the positioning messages and storing positioning message data; and calculating a position of the underwater glider, which comprises:

extracting, from the positioning message data, the TOAs $t_{n-1}$, $t_n$, and $t_{n+1}$ of (n−1)-th, n-th, and (n+1)-th positioning messages, pitch angles $\theta_{n-1}$, $\theta_n$, and $\theta_{n+1}$, heading angles $\phi_{n-1}$, $\phi_n$, and $\phi_{n+1}$, and depths $z_{n-1}$, $z_n$, and $z_{n+1}$ of the underwater glider at corresponding times;

creating virtual beacons $VB_{n-1}$ and $VB_{n+1}$ wherein plane coordinates of the $VB_{n-1}$ are $(X_{VB,n-1}, Y_{VB,n-1})$, a depth of the $VB_{n-1}$ is $Z_{VB,n-1}$, and latitude and longitude coordinates of the $VB_{n-1}$ are $(L_{VB,n-1}, B_{VB,n-1})$; and plane coordinates of the $VB_{n+1}$ are $(X_{VB,n+1}, Y_{VB,n+1})$, a depth of the $VB_{n+1}$ is $Z_{VB,n+1}$, and latitude and longitude coordinates of the $VB_{n+1}$ are $(L_{VB,n+1}, B_{VB,n+1})$;

calculating the position of the underwater glider based on the TDOA:

correcting TOAs of the virtual beacons $VB_{n-1}$ and $VB_{n+1}$ to obtain corrected TOAs $t_{VB,n-1}$ and $t_{VB,n+1}$;

$$t_{VB,n-1} = t_{n-1} + ri\left(\frac{t_n - t_{n-1}}{T}\right) \cdot T, \text{ and } t_{VB,n+1} = t_{n+1} - ri\left(\frac{t_{n+1} - t_n}{T}\right) \cdot T,$$

wherein ri is a rounding function; and calculating latitude and longitude coordinates $(L_n, B_n)$ of the underwater glider at the time $t_n$ to complete the positioning of the underwater glider.

2. The method for positioning the underwater glider based on the virtual TDOA of the single beacon according to claim 1, wherein parsing the positioning messages and storing positioning message data comprises:

parsing the positioning message to obtain longitude $L_{RB}$, latitude $B_{RB}$ and depth $Z_{RB}$ of the positioning beacon; and reading current attitude information of the underwater glider, comprising a pitch angle $\theta_n$, a heading angle $\phi_n$ and a depth $z_n$ at the time $t_n$, wherein the pitch angle is an included angle between a moving direction of the underwater glider and a horizontal plane, the heading angle is an included angle between a horizontal component of the moving direction of the underwater glider and a due east direction, and the time $t_n$ is a time at which the n-th positioning message arrives at the underwater glider.

3. The method for positioning the underwater glider based on the virtual TDOA of the single beacon according to claim 1, wherein creating the virtual beacons comprises:

creating the virtual beacon $VB_{n-1}$ based on the positioning message data and the attitude information of the underwater glider at the times $t_{n-1}$ and $t_n$:

taking a due east direction as a positive direction of X-axis and a due north direction as a positive direction of Y-axis, converting latitude and longitude coordinates $(L_{RB}, B_{RB})$ of a real positioning beacon parsed at the time $t_n$ into plane coordinates $(X_{RB}, Y_{RB}) = LB2XY(L_{RB}, B_{RB})$, wherein LB2XY represents a conversion from the latitude and longitude coordinates to the plane coordinates; in the plane coordinates of the $$X_{VB,n-1} = X_{RB} + (z_n - z_{n-1})\arctan\frac{\theta_n + \theta_{n-1}}{2}\cos\frac{\phi_n + \phi_{n-1}}{2} \text{ and}$$

$$Y_{VB,n-1} = Y_{RB} + (z_n - z_{n-1})\arctan\frac{\theta_n + \theta_{n-1}}{2}\sin\frac{\phi_n + \phi_{n-1}}{2};$$

and the depth of the $VB_{n-1}$ is $Z_{VB,n-1} = Z_{RB} + z_n - z_{n-1}$; and converting the plane coordinates $(X_{VB,n-1}, Y_{VB,n-1})$ to latitude and longitude coordinates $(L_{VB,n-1}, B_{VB,n-1}) = XY2LB(X_{VB,n-1}, Y_{VB,n-1})$, wherein XY2LB represents a conversion from the plane coordinates to the latitude and longitude coordinates;

creating another virtual beacon $VB_{n+1}$ based on the positioning message data and the attitude information of the underwater glider at the times $t_n$ and $t_{n+1}$:

$$X_{VB,n+1} = X_{RB} - (z_{n+1} - z_n)\arctan\frac{\theta_n + \theta_{n+1}}{2}\cos\frac{\phi_n - \phi_{n+1}}{2};$$

$$Y_{VB,n+1} = Y_{RB} - (z_{n+1} - z_n)\arctan\frac{\theta_n + \theta_{n+1}}{2}\sin\frac{\phi_n - \phi_{n+1}}{2};$$

$$Z_{VB,n-1} = Z_{RB} - z_{n+1} + z_n;$$

and $(L_{VB,n+1}, B_{VB,n+1}) = XY2LB(X_{VB,n+1}, Y_{VB,n+1}).$

4. The method for positioning the underwater glider based on the virtual TDOA of the single beacon according to claim 1, wherein calculating the position of the underwater glider based on TDOA comprises:

constructing a least squares positioning equation AX=H+ Kd, wherein A, H, and K are known matrices, X is a position matrix to be solved, and d is an intermediate variable, $$A = \begin{bmatrix} 2(X_{VB,n-1} - X_{RB}) & 2(Y_{VB,n-1} - Y_{RB}) \\ 2(X_{VB,n+1} - X_{RB}) & 2(Y_{VB,n+1} - Y_{RB}) \end{bmatrix},$$

$$K = \begin{bmatrix} 2(c(t_{VB,n-1} - t_n)) \\ 2(c(t_{VB,n+1} - t_n)) \end{bmatrix},$$

$$X = \begin{bmatrix} x_n \\ y_n \end{bmatrix}, \text{ and}$$

$$H = \begin{bmatrix} (X_{RB}^2 + Y_{RB}^2) - (X_{VB,n-1}^2 + Y_{VB,n-1}^2) + (Z_{RB} - z_n)^2 - (Z_{VB,n-1} - z_n)^2 + (c(t_{VB,n-1} - t_n))^2 \\ (X_{RB}^2 + Y_{RB}^2) - (X_{VB,n+1}^2 + Y_{VB,n+1}^2) + (Z_{RB} - z_n)^2 - (Z_{VB,n+1} - z_n)^2 + (c(t_{VB,n+1} - t_n))^2 \end{bmatrix},$$

wherein c is an effective sound velocity, and $x_n$ and $y_n$ represent a plane coordinate position of the underwater glider at the time $t_n$;

solving the intermediate variable d:

constructing a quadratic equation with one variable $a_1 d^2 + a_2 d + a_3 = 0$ about the intermediate variable d, wherein intermediate variables $a_1$, $a_2$ and $a_3$ of the equation are:

$a_1 = N^2(1,1) + N^2(2,1) - 1$, $a_2 = 2(M(1,1) - X_{RB})N(1,1) + 2(M(2,1) - Y_{RB})N(2,1)$, and $a_3 = (M(1,1) - X_{RB})^2 + (2,1) - Y_{RB})^2 + (z_n - Z_{RB})^2$, wherein M and N are expressed by A, H and K as $M = (A^T A)^{-1} A^T K$ and $N = (A^T A)^{-1} A^T H$, T represents transpose;

and solving the equation to obtain $$d = \frac{-a_2 \pm \sqrt{a_2^2 - 4a_1 a_3}}{2a_1},$$

and discarding a singular value to obtain the intermediate variable d; and solving the position matrix X to obtain a horizontal position $(L_n, B_n)$ of the underwater glider at the time $t_n$:

$$X = (A^T A)^{-1} A^T H + (A^T A)^{-1} A^T K d = \begin{bmatrix} x_n \\ y_n \end{bmatrix},$$

converting the plane coordinates $(x_n, y_n)$ to latitude and longitude coordinates to obtain the horizontal position of the underwater glider at the time $t_n$: $(L_n, B_n) = \text{XY2LB}(x_n, y_n)$.

* * * * *